Oct. 6, 1970 M. L. DERTOUZOS 3,532,864
LINEAR INTERPOLATION FUNCTION GENERATION
Filed Aug. 8, 1967 3 Sheets-Sheet 1
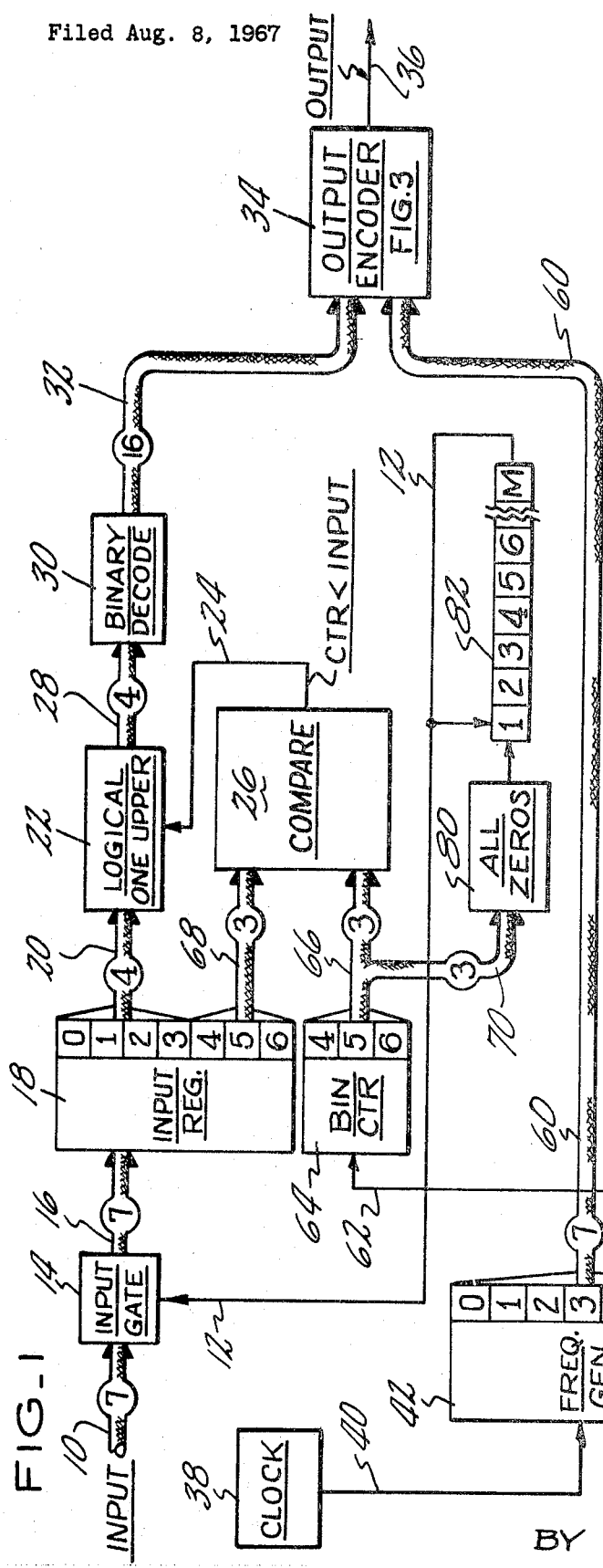
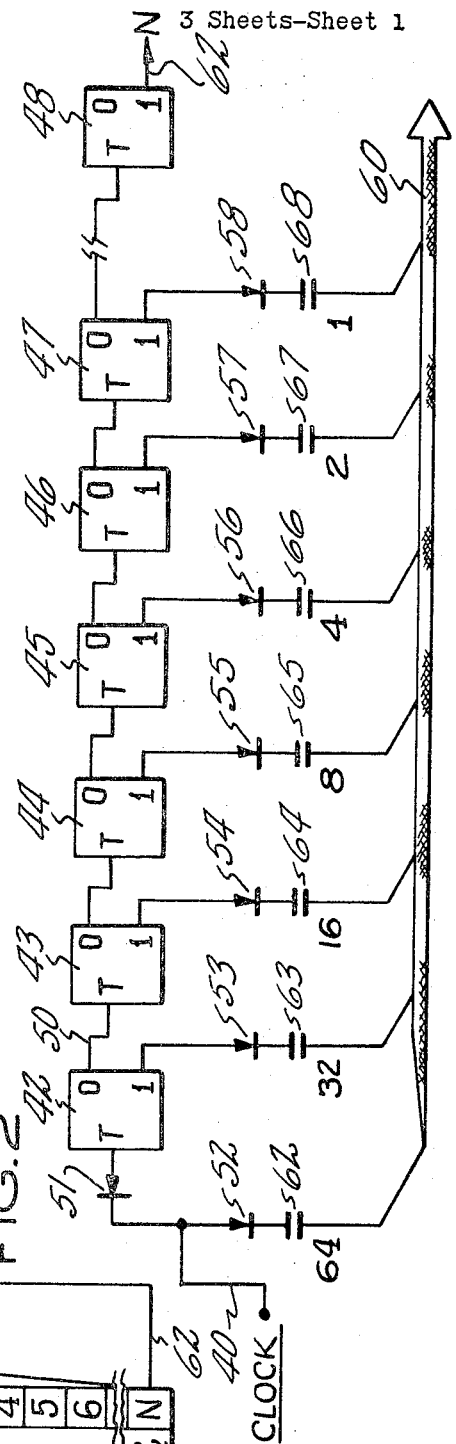
INVENTOR
MICHAEL L. DERTOUZOS
BY *Melvin Pearson Williams*
ATTORNEY

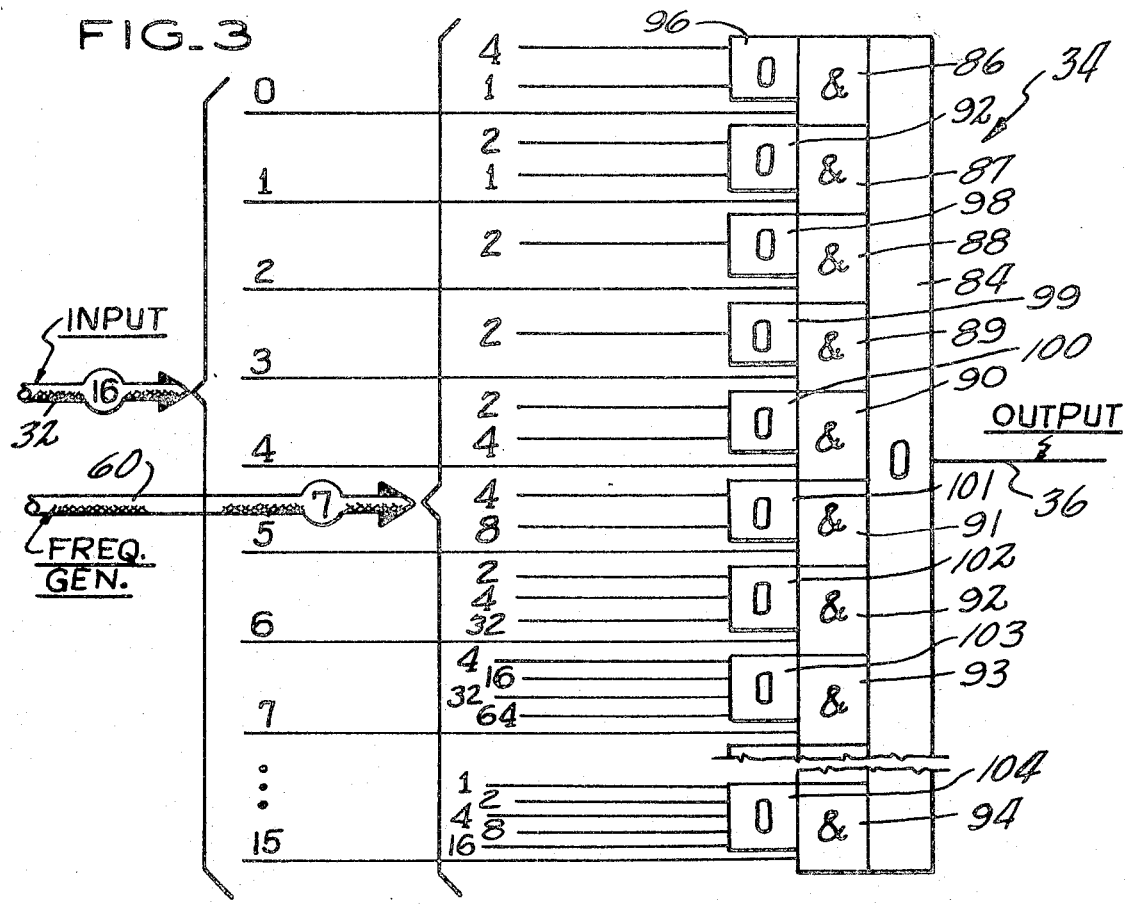
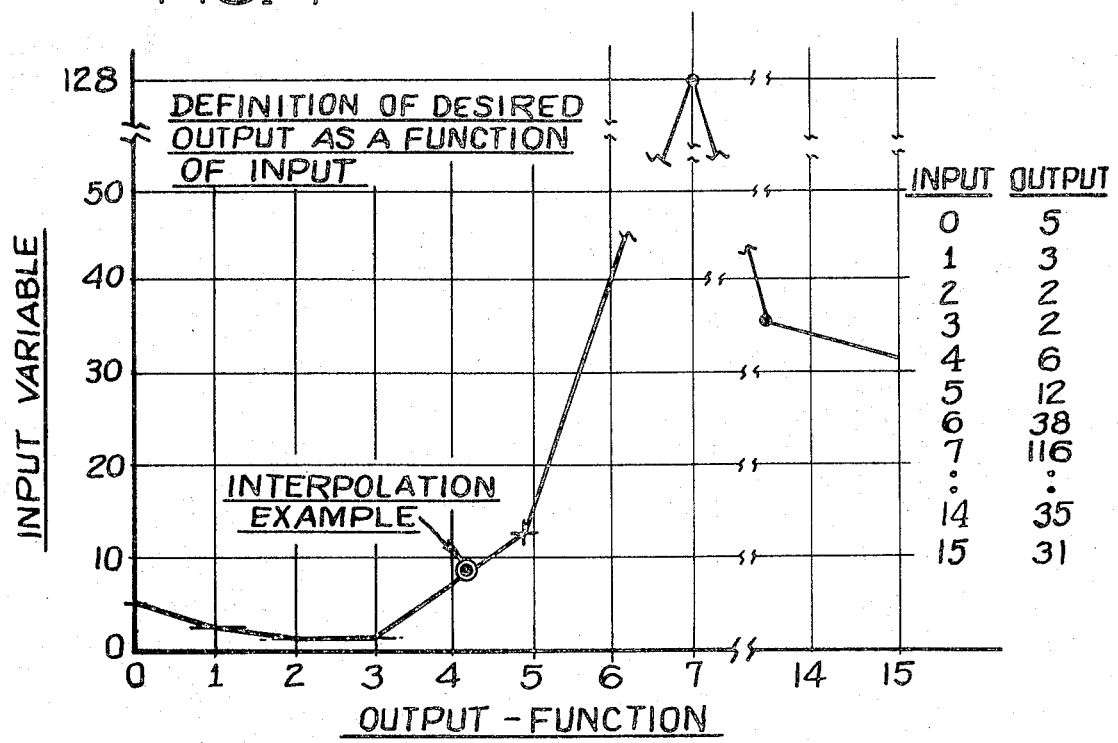

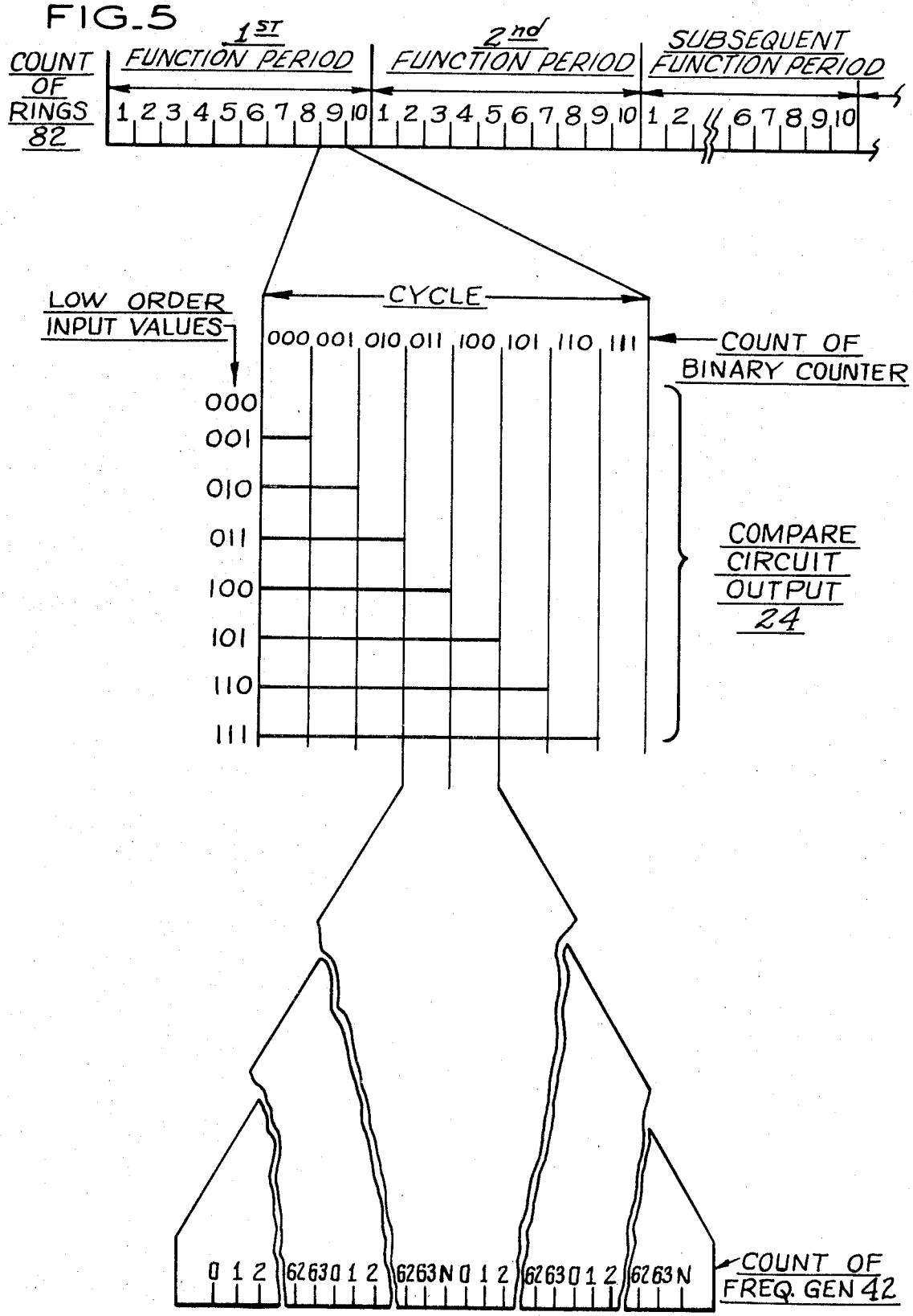

United States Patent Office 3,532,864
Patented Oct. 6, 1970

3,532,864
LINEAR INTERPOLATION FUNCTION GENERATION
Michael L. Dertouzos, Waban, Mass., assignor to United Aircraft Corporation, East Hartford, Conn., a corporation of Delaware
Filed Aug. 8, 1967, Ser. No. 659,123
Int. Cl. G06f 5/00
U.S. Cl. 235—154                    2 Claims

ABSTRACT OF THE DISCLOSURE

The encoding of an output signal as a function of the input signal utilizing an encoder having fewer orders of data than the number of orders required in the output signal is achieved by linear interpolation between output values which are a function of high order input values, using low order input values to take the next lower high order output value and the next higher high order output value a proportional number of times during a plurality of sampling times so that the weight value of the output reflects some value between the two higher order output values, which gives an output interpolated between two of the points of higher order output values which are achievable in the decoder.

---

The invention herein described was made in the course of a contract with the Department of the Air Force.

BACKGROUND OF THE INVENTION

Field of invention

This invention relates to function generators, and more particularly to linear interpolation in a digital system in which values are expressed as discrete frequencies.

Description of the prior art

As is well known in the art, function generation can be achieved in a variety of ways. For instance, in many guidance and control applications, such as controlling the rate of flow of fuel into the engine of an aircraft, analog computers are widely used because of the simplicity of performing a single given function with relatively reliable hardware. Additionally, where slow speed of computation is permitted, high speed digital operations are not necessary. On the other hand, analog components are frequently bulky in comparison with digital circuits which are produced in accordance with modern micro-circuits technology. Furthermore, radiation characteristics, resistance to heat and other elements, and dependance upon voltage supplies and other environmental parameters render analog equipment less desirable than digital equipment in certain applications. Contrariwse, digital equipment can be very cumbersome and expensive since mathematical operations of great complexity may be required in order to generate an output as a function of an input variable which suits the design need of a device being controlled by the function. Therefore, any special purpose computers have heretofore been designed in accordance with either the analog or digital computer techniques, at a sacrifice of maximum optical design specifications.

SUMMARY OF INVENTION

An object of the invention is to provide a special purpose digital computer having the simplicity and reliability of certain of the analog computer systems known to the prior art.

According to the present invention, a value represented by the high order components of an input function, and a value which is one unit greater than the value represented by the high order components of the input function, are each selected a number of times in response to a value represented by the value of the low order components of the input function so as to provide an average output which is of a magnitude between the two high order magnitudes in such fashion as to provide interpolation in response to the low order values. In further accord with the present invention, a digital representation of some parameter is encoded into an output representation expressed as a plurality of discrete frequencies by passing through a digital pulse frequency modulation encoder having fewer orders than the number of orders in the input representation, the remaining orders being accommodated through the interpolation described hereinbefore.

In accordance with one embodiment of the present invention, the low order values of the input variable are compared against an arbitrary cycling counter and the output of the comparator is utilized to increment the value expressed by the high order values of the input variable by one unit, the absence of an output from the comparator passing the high order values of the input variable unchanged. The output encoder of the comparator is allowed to operate at such a rate, in response to the cycling counter, so that a number of sampling periods, within which the high order values may be passed unchanged or incremented by one unit, is an integral multiple of the number of units of interpolation which must be achieved in order to express the output variable to the same precision as the input variable.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 1 is a schematic block diagram of one embodiment of the present invention;

FIG. 2 is a schematic block diagram of a frequency generator for use in the circuit of FIG. 1;

FIG. 3 is a schematic block diagram of an output encoder for use in the embodiment of FIG. 1;

FIG. 4 is a chart of outputs as a function of inputs; and

FIG. 5 is a timing diagram illustrating the operation of the embodiment of FIG. 1.

DESCRIPTION OF THE PREFERRED EMBODIMENT

For illustrative purposes, and in order to enable a teaching of the principals of the invention without unduly complicating the details thereof, the exemplary embodiment disclosed herein includes a seven bit input signal in which the four higher ordered bits are used to operate the output encoder, which limits the size of the encoder to sixteen input variables. The three low order bits are used to provide interpolation so that an accuracy equivalent to seven binary bits is achieved with an encoder which has apparatus for encoding to an accuracy of four binary bits. This is the primary aspect of the present invention.

Referring to FIG. 1, the seven bit input signal is received over a trunk of seven lines 10 and, upon receipt of a suitable gating signal on the line 12, the input signals will pass through an input gate 14 to another trunk of seven lines 16 and into an input register 18. The four highest ordered bits (bits designated 0 through 3) are passed over a trunk of four lines 20 to a logical one-upper 22 where the binary value of the four bits on the trunk 20 may be passed without change, or may be altered so as to represent a value which is one unit higher, in dependence upon receipt of a signal on a line 24 from a compare circuit 26. This may be a circuit of a known type, of which several designs are available. The output of the logical one-upper 22 is passed over a trunk of four lines 28 to a binary decode circuit 30, the output of which is passed over a trunk of sixteen lines 32 to an output encoder 34, the details of which are shown and described with respect to FIG. 3, hereinafter. The output of the circuit is the product of the output encoder 34 on a line 36, which, as described in more detail hereinafter, will comprise a train of pulses, the number of pulses over a given period of time being indicative of the magnitude of the output signal.

The overall control of the embodiment of the invention shown in FIG. 1 is governed by pulses from a clock circuit 38, as illustrated in FIG. 5, which pulses are passed over a line 40 so as to operate a frequency generator 42. The details of the frequency generator, in one exemplary form, are illustrated in FIG. 2. Therein, the clock signals on line 40 operate a sequence of bistable trigger stages 42–48 which together comprise a binary counter (sometimes referred to as a binary divider). Thus the clock signal on line 40 will reverse the setting of the first trigger 42 each time the positive signal appears, in accordance with the well-known characteristics of triggers, which are sometimes referred to as flip-flops. As trigger 42 turns off, the zero side output thereof is coupled via line 50 to cause a reversal of the trigger 43. In a similar fashion, each trigger in the series of triggers 42–48, as it turns off, will reverse the next trigger subsequent thereto in the series. Because of the variety of circuitry which can be utilized to implement logic being described in the exemplary embodiment herein, it is immaterial whether positive or negative signals are used for affirmative manifestations, but for the purposes of illustration, it is assumed that the clock signals on the line 40 are positive, and that the "1" output of each of the triggers 42–47 is also positive. Thus, a plurality of diodes 51–58 are shown polled for conduction in response to positive signals from the clock line 40 or from a corresponding one of the triggers 42–47. The purpose of the diodes is to illustrate the fact that in the embodiment herein, the output of the frequency generator 42, which is applied over the trunk of seven lines 60 to the output encoder 34, appears from each related trigger 42–47 when the trigger is in the ON state (or establishes an output from the "1" side). A plurality of capacitors 62–68, each relating to corresponding one of the diodes 52–68 insures that only a single pulse is passed from the diodes 52–58 to the related one of the trunk of seven lines 60. Consider a simplified table of binary values:

000
001
010
011
100
101
110
111

As can be seen in the table, as the values expressed therein progress from lower to higher values, only one of the binary bits at a time changes from a zero to a one. In other words, in going from 011 to 100, although the bits having binary weight of ONE and TWO turn off, only the bit having binary weight FOUR turns on. Thus, there will be only one output from the frequency generator 42 at any one time because the diodes 52–58 limit the output signals to the ON or ONE position, and the capacitors 62–68 limit this to being a short pulse indicative of the transition from OFF to ON. Therefore, for each pulse of the clock, there will be one pulse on one of the lines 60 in dependence upon which one of the triggers 42–47 has turned ON.

The output of the trigger 47 may be coupled to one or more additional triggers, such as trigger 48, so as to supply timing signal which bears a known relationship to the occurrence of output pulses from the frequency generator 42. This timing signal could be the output of the trigger 47 in which case there would be one timing signal for each complete count of the frequency generator 42; alternatively, by providing a single trigger 48, the frequency generator must roll through twice before each timing signal generated. If desired, additional triggers may be provided so that more inputs from the frequency generator may transpire between timing signals.

The output of the last trigger stage of FIG. 2 (herein stage 48) is applied by a line 62 to a binary counter 64. The binary counter 64 has three stages and may be of the same general form as that shown in FIG. 2, although the diodes and capacitors would not be required except for some particular circuit implementation detail not apparent herein. The binary counter 64 is used as an emitter to generate successive binary values for comparison with the three lowest ordered values of the input signal. The binary counter will present, over a trunk of three lines 66 to the compare circuit 26, successive values of from zero to seven expressed as combinations of three binary bits. The three low order bits of the input register 18 are similarly applied over a trunk of three lines 68 to the compare circuit 26. The compare circuit 26 is of a conventional nature, and is of the type that can distinguish between "equal to or greater than" and "less than"; thus the output signal on line 24 will be present so long as the counter has not arrived at the same value as set in the three low order bits of the input rigister.

The output of the binary counter 62 is also applied over a trunk of three lines 70 to an all-zeros detector 80, the output of which is used to step a ring 82 which may be of any desired size. For instance, a value M indicating the highest count of the ring may be equal to ten so that the ring will count to ten and then issue an output signal on the line 12 which is used to gate the next input function through the input gate 14. The purpose of this is to allow each input function to be sampled many times by the binary counter 64 before the next input function is utilized However, in any implementation of the apparatus where such an input gate is not needed, then the trunk of three lines 70, the all-zeroes detector 80, the ring circuit 82, the gate line 12 and the input gate 14 may all be eliminated, input functions thereby being applied directly to the trunk of seven lines 16, and the content of the input register 18 being changed whenever a new input function arrives.

The output encoder 34 is shown in detail in FIG. 3. Therein, the output signal on line 36 is generated by an OR circuit 84 which is responsive to any one of sixteen AND circuit 86–94. Each of the AND circuits 86–94 (a few of which are broken away for simplicity) correspond to one of the input magnitudes of zero through fifteen. Each of the AND circuits 86–94 is responsive, as shown in FIG. 3, to a related OR circuit 96–104. Each of the OR circuits 96–104 receives (over corresponding ones of the trunk of seven lines 60 from the frequency generator) frequency components indicative of the magnitude of output value corresponding to the related input value. For instance, as shown in FIG. 4 in both tabular and graphic form, an input value of ZERO is defined to require an output value of FIVE. Thus, the wires carrying frequency components having a weight value of FOUR and ONE are connected to the uppermost OR circuit 96 in FIG. 3 which corresponds to an input value of ZERO. Since the input value is represented by a steady state signal on any one of the sixteen lines in the trunk 32, the related AND circuit 86–94 will be enabled so that whenever frequency components appear on related ones of the lines 60, they will pass through a corresponding OR circuit 96–104 and through the related AND circuit 86–94, which thereupon becomes active because of a signal at both of the inputs thereto, the related AND circuit 86–94 will operate the OR circuit 84, and a pulse will pass through to the output line 36. Note that in the example of an input value of ZERO (which requires an output value of five) four pulses will pass through the related OR circuit 96 to correspond to a value of FOUR, and one pulse will pass to the OR circuit 86 to correspond to the value ONE, so the total of five pulses (equal to the output magnitude) will pass through the OR circuit 96, the AND circuit 86, and the OR circuit 84, so that there will be five pulses resulting on the output line 36. Consider an input signal having a value of SEVEN: the output is defined to be equal to 116, and so the line from the frequency generator representing a value of FOUR will pass four pulses through the related OR circuit 103, the line relating to a value of SIXTEEN will pass sixteen pulses through the OR circuit 103, the line relating to a value frequency of THIRTY-TWO will pass thirty-two pulses, and the line relating to a value of SIXTY-FOUR will pass sixty-four pulses. It should be noted that for each pulse that appears on the line of value FOUR, four pulses will appear on the line of value SIXTEEN, eight pulses will appear on the line of value THIRTY-TWO, and sixteen pulses will appear on the line of value SIXTY-FOUR. Over the span of the four pulses applied on the line of value FOUR, all of the remaining pulses will be interspersed therewith on the various lines; similarly, for all of the sixteen pulses appearing on the line value SIXTEEN, the remaining pulses on the lines of value THIRTY-TWO and SIXTY-FOUR will be presented in an interspersed fashion therewith. This is due to the fact that the frequency generator of FIG. 2 continues to put out pulses, the capacitor 62 passing a pulse one for each clock signal, the capacitor 63 passing a pulse once for every other clock signal, the capacitor 64 passing a pulse for every fourth clock signal, and so forth. From the above, it is apparent that the value of the output signal on line 36 is equal to the number of pulses which appear on the output line 36 per unit length of time.

Consider as a first example of operation, a case where there is an input signal having a value of FOUR, which is one of the values that does not require interpolation since the output encoder 34 is capable of encoding the output value corresponding to an input value of FOUR without interpolation. The period will begin because of the fact that the binary counter has rolled to zero for the Mth time so that the all-zeroes detector 80 has again sent a signal to the ring 82 and finally advanced the ring counter to its highest ordered state (M) indicating that the end of the preceding input period has been reached. This will cause a signal on the line 12 to energize the input gate 14 so as to pass a new function of input signals from the trunk of seven lines 10 over the trunk of seven lines 16 into the input register 18. At this time, the binary counter 64 is set to 000. Because the low order bits in a given example are all zeroes (since an integral input value of FOUR is completely represented without use of the low order bits), the signals on the trunk of three lines 68 to the compare circuit 26 are all zeroes. During the first cycle, the binary counter is set at all zeroes and so three zeroes are passed over the trunk of three lines 66 to the compare circuit 26. Since this compare circuit will provide an output signal only when the setting in the binary counter is less than the setting of the input signals (and not equal or greater than) there is no signal on the output line 24 to the logical one-upper 22. Thus, the logical one-upper 22 will pass the high order bits of the input register 18 over the trunk of four lines 20 and the trunk of four lines 28 to the binary decoder 30, which sends a corresponding signal on one of the sixteen lines 32 to the output encoder 34. This one line in the present example will be for an input value of FOUR (in the middle of FIG. 3), and the AND circuit 90 is enabled so that it may operate anytime there is an output from the related OR circuit 100. During this cycle, two pulses will appear on the frequency generator line corresponding to values of FOUR, then a pulse will appear on a line corresponding to values to TWO, and two more pulses will appear on a line corresponding to FOUR, and another pulse will appear on line corresponding to TWO. Each time one of these pulses appears, the OR circuit 100 will cause the related AND circuit 90 to pass a signal through the OR circuit 84 to the output line 36. Thus, in the first cycle of operation, during this exemplary input period, six pulses were placed on the output line 36. Next, the frequency generator will again flow through all of its stages, and (as shown in FIG. 2 with the single extra trigger 48) it will again put six pulses on to the output line 36 before a signal appears on the line 62 to again step the binary counter 64. Thus, a total of twelve pulses will be put on the output line 36 prior to advancing the binary counter 64. In a similar fashion, during each of eight cycles (in the embodiment shown in FIG. 1) twelve pulses will appear on the output line 36. The reason is that no matter what setting the binary counter achieves, it is always equal to or higher than the input signal which is all zeroes from the three low order bits of the input register 18. Thus, a total of 96 pulses will appear on the output line 36 as a result of an input value of four as the binary counter rolls from all zeroes to 001 . . . through all ones and back to zero. It is to be noted that because of the fact that no interpolation is required (the binary counter never having had a value in it less than the input signal three low order bits), no signal appeared at the output of the compare circuit 26 on line 24 and so the logical one-upper passed the four high order bits of the input register without change in each of the eight cycles of the binary counter.

Consider now an input function which is set into the input register in which the equivalent decimal value is FOUR and ONE-QUARTER, meaning that the four high order bits of the input register are the same as they were in the previous example (for an input value of decimal FOUR), but the three low order bits now are: 010. During the first cycle of operation, the binary counter is set to: 000. Since this is less than the 010 set in the three low order bits of the input register, there will be an output signal on line 24 to the logical one-upper 22. This will cause the value of 0100 in the high order bits of the input register 18 to appear on the trunk of four lines 28 at the input to the binary decode circuit 30 as 0101, which is equal to decimal FIVE, and one value higher than the value expressed by the high order bits of the input signal (FOUR). The binary decode circuit 30 will, therefore, cause the line equal to an input vlaue of FIVE to pass a signal to the output encoder 34. As seen in FIG. 4, an input value of FIVE calls for an output value of 12. Thus, the OR circuit 101 corresponding to an input value of FIVE has frequency inputs of FOUR and EIGHT, and since the frequency generator 42 will cycle twice before again advancing the binary counter, twenty-four pulses will appear on the output line 36. Then, after the frequency generator 42 has cycled twice, there will be an output from the trigger 48 so as to cause the line 62 to have a signal to advance the binary counter 64 so the count therein advances to 001. Since 001 is still less than 010, the second cycle, therefore, results in another twenty four pulses being applied over the output line 36. Again, at the end of the rolling of the frequency generator 42, the trigger 48 will apply a signal on line 62 to the binary counter 64 to advance the count therein to 010. At this time, the input to the compare circuit 26 from the binary counter equals the input thereto from the input register. Thus, the value in the counter is no longer less than the value in the input register (they being the same), so there is no signal output from the compare circuit 26 on the line 24. This results in the logical one-upper 22 passing the input register high order values over the trunks of four lines 20, 28 to the binary decoder 30 without change. In this case, the higher order bits specify a value of FOUR, so that (as described in detail with respect to the previous example without interpolation) twelve signals will be applied to the output line 36 since an output value of SIX corresponds to an input value of FOUR, and twelve pulses appear therein since the frequency generator can pass through its setting twice before the binary counter is again advanced. When the binary counter is stepped to its next value, it will have a value of 011 which is higher than the setting of the low order bits in the input register 18; as a matter of fact, all subsequent settings of the binary counter for this input period will be greater than the value of the low order bits in the input register, so that for each successive cycle twelve signals will be placed on the output line 36. Thus, the first two cycles each resulted in twenty-four signals being placed on the output line 36, and the remaining six cycles each resulted in twelve signals being placed on the output line 36. This results in a total of one hundred and twenty pulses on the output line 36 during the complete period for this input signal. Since the decimal value of the output is equal to the number of pulses divided by sixteen, the output value will be seven and one-half. This is seen to be equal to one hundred and twenty pulses divided by sixteen, where sixteen represents two complete passes of the frequency generator in each cycle. This value of 7.5 is also equal to one-quarter of the difference between the output value of twelve (which corresponds to an input value of FIVE) and an output value of SIX (which corresponds to an input value of FOUR). Since four and a quarter is one-quarter the distance between the input values of four and five, it should result in a value of seven and one-half which is one quarter the distance between the input values of six and twelve corresponding to input values of FOUR and FIVE.

In the example given, a large number of pulses are used for each input period (sixteen complete possible settings, of numbers of pulses equal to either the high order bits of the input value, or to high order bits of a value one greater than the input for interpolative purposes) in order to give a reasonable degree of accuracy in the averaging technique used herein. The timing scheme shown herein is exemplary merely, and various other methods of timing, with different averaging bases, different relationships between the number of counts of the frequency generator which will result in one count of the binary counter, and so forth, may be used as desired.

The logical one-upper 22 is shown placed between the input register and the binary decoder 30. This is so because it requires only a four bit input logic circuit at this point; however, the output of the binary decode circuit could be utilized instead as an input toa logical one-upper, if such a circuit could handle the output capacity of the binary decode circuit 30. In a similar fashion, instead of using a compare circuit along with the binary counter 64, it is possible to use the input values of the low order bits in the input register 18 to operate a single shot gate circuit in a particular fashion so as to permit the same result as occurs with the output signal 24 of the compare circuit 26. In fact, there are many alternative ways in which the various functions of the invention herein could be implemented without departing from the teachings herein. It should also be apparent that time averaging as taught herein may be utilized with a parallel digital output as well as with the serial output disclosed herein, although one of the advantages of the invention would be mitigated by the ned for averaging the parallel digital vlaue so as to provide the interpolated output therefrom.

Although the invention has been shown and described with respect to preferred embodiments thereof, it should be understood by those skilled in the art that the foregoing and other changes and omissions in the form and detail thereof may be made therein without departing from the spirit and scope of the invention.

Having thus described typical embodiments of the invention that which is claimed as new and to be secured by Letters Patent of the United States is:

1. A digital frequency interpolation apparatus comprising:
   means to encode an output value as a function of the high order portions of an input variable once in each of a plurality of cycles;
   and means responsive to the low order values of the input variable for selectively incrementing the input variables applied to said encoding means for a given number of said plurality of cycles which bears the same proportion to the total number of said plurality of cycles as the value expressed by the low order portion of said input variable bears to the increment of value expressible by the low order portions of said input variable.

2. The interpolation apparatus according to claim 1 wherein said incrementing means comprises a binary counter capable of being successively set to different ones of a sequence of counts in successive ones of said cycles;
   and means for comparing counts in said binary counter with the low order portion of said input variable and for incrementing the high order portion of said input variable by one unit in each cycle wherein the count established in said binary counter is less than the value expressed by the low order portion of said input variable.

References Cited

UNITED STATES PATENTS

| | | | |
|---|---|---|---|
| 3,435,134 | 9/1969 | Richards | 179—15.55 |
| 3,424,869 | 1/1969 | Anderson. | |
| 3,384,889 | 5/1968 | Lucas | 340—347 |
| 3,345,505 | 10/1967 | Schmid | 235—197 |
| 3,152,249 | 10/1964 | Schmid | 235—150.51 |

MAYNARD R. WILBUR, Primary Examiner

J. GLASSMAN, Assistant Examiner

U.S. Cl. X.R.

340—347